FIG. 2.

INVENTOR.
ROSS EUGENE RISSER JR
BY Warren P. Horton
ATTORNEY.

Nov. 29, 1955    R. E. RISSER, JR    2,724,970
FLUID METERS
Filed April 23, 1952    7 Sheets-Sheet 4

INVENTOR.
ROSS EUGENE RISSER JR.
BY
ATTORNEY.

Nov. 29, 1955    R. E. RISSER, JR    2,724,970
FLUID METERS
Filed April 23, 1952    7 Sheets-Sheet 6

INVENTOR.
ROSS EUGENE RISSER JR.
BY Warren D. Horton
ATTORNEY.

United States Patent Office 2,724,970
Patented Nov. 29, 1955

2,724,970

FLUID METERS

Ross Eugene Risser, Jr., Bonham, Tex.

Application April 23, 1952, Serial No. 283,886

6 Claims. (Cl. 73—244)

The present invention relates to a fluid meter of the type which is adapted to be used in automotive service station dispensing equipment or the like and more particularly to an improved construction and arrangement of distributing valve, valve operating means and register driving mechanism.

In the gasoline dispensing equipment commonly found in service stations, gasoline is pumped under pressure from a storage tank to a displacement meter which discharges into a pipe line leading to a flexible hose and nozzle used in such installations for conveying gasoline from the pipe line to the receptacle being filled. The displacement meter ordinarily includes a plurality of pistons reciprocated in cylinders by the pressure of the incoming gasoline and these cylinders discharge into ports and ducts communicating with a discharge passageway in the meter connected to the delivery pipe line of the system. A distributing valve driven by these pistons through the intermediary of a valve operating plate controls the flow of gasoline discharged from the cylinders in such a manner that the incoming gasoline exerts a driving force on the pistons in sequence so that the pistons are reciprocated and the valve-operating plate and valve are operated. Operation of these pistons forces gasoline into the discharge passageway of the meter and from this passageway into the delivery pipe line and the flexible hose and nozzle.

In one form of meter the distributing valve is driven by the pistons through the intermediary of a valve-operating plate, and the movable valve in turn is operatively connected to and drives a register which visually indicates the volume of gasoline dispensed and quite frequently the cost of the particular volume which has been dispensed. The present invention is concerned particularly with improvements in these parts of the metering apparatus aimed at producing a better and more accurate operation thereof over a long period of time.

Accordingly, an object of the invention is the provision in a fluid meter of the type above mentioned of an improved construction of the valve and valve-operating plate which permits orbital movement of the valve and plate over the valve seat in a horizontal plane as contrasted with previous constructions wherein the valve seat is semispherical.

Another object of the invention is the provision of a new and improved fluid meter having a valve-operating plate and fulcrum means on this plate which engage with a stationary portion of the meter structure for insuring a positive cut-off at the top and bottom of each piston stroke without impeding orbital movement of the valve-operating plate and valve.

A further object of the invention is the provision of a new and improved fluid meter having means adapted to engage a nutating member on the distributing valve, adjustable from the exterior of the meter housing to increase or decrease the length of stroke of the pistons and the orbital travel of the valve.

A still further object of the invention is the provision of a new and improved fluid meter having a crank arm mounted on the distributing valve and a driving disc on the register driving mechanism engaging the crank arm pin, the disc being of such configuration that it forces the valve to travel over an orbital path throughout its cycle of operation and thereby prevents short stroking of the valve so that an accurate reading on the register of the volume of liquid flowing through the meter is obtained.

Yet another object of the invention is the provision of a new and improved fluid meter having a distributing valve and valve-operating plate so constructed and arranged that the liability of wear on these parts is greatly reduced and as a result the meter remains accurate over extended periods of use.

A further object of the invention is the provision in the construction of a fluid meter of this type of a pivot pin positioned through the main body of the valve seat which rocks in combination with the fork and other pivot pins for mounting the yoke to give a full universal movement, one in which the crank arm travels in a given arc so that in combination with the valve arm, the distributing valve is moved in an accurately defined radius.

A further object of the invention is the provision of a fluid meter in which the number of parts have been reduced and their construction has been greatly simplified without in any way impairing their wearing qualities or accuracy.

A further object of the invention is the provision of a new and improved fluid meter of simplified and improved construction and arrangement of parts which is inexpensive to manufacture but nevertheless sufficiently sturdy to withstand long periods of use without necessitating repair or major adjustment of the parts and which may be readily adjusted or dismantled for repair or replacement.

A further object of the invention is the provision of a distributing valve having a flat valve face for cooperating with the various ports of the valve seat in a sliding motion so that wear on the surfaces can be easily taken up.

This invention is an improvement over the construction of the subject matter shown and described in my patent, Number 2,616,293, issued November 4, 1952.

These and other objects of the invention will become apparent from the ensuing description, reference being had to the accompanying drawings, in which.

Figure 1:
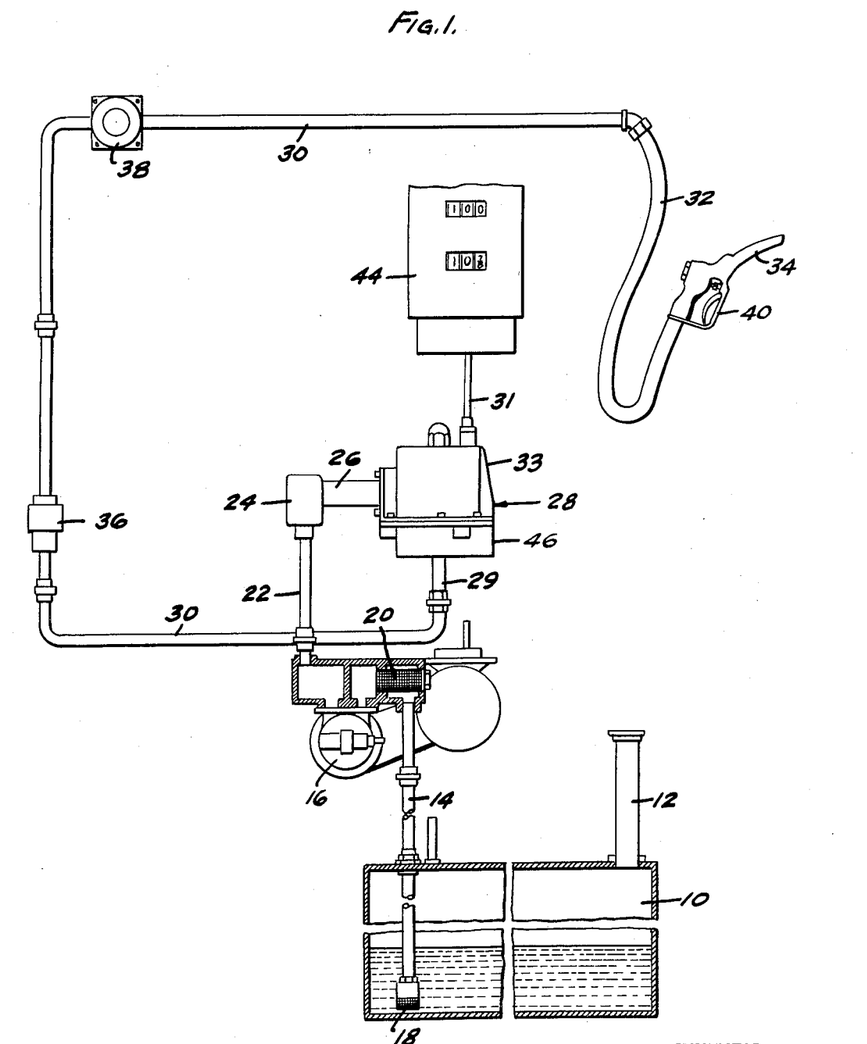
Fig. 1 is a diagrammatic representation of an arrangement of dispensing equipment particularly suitable for gasoline service stations.
Figure 2:
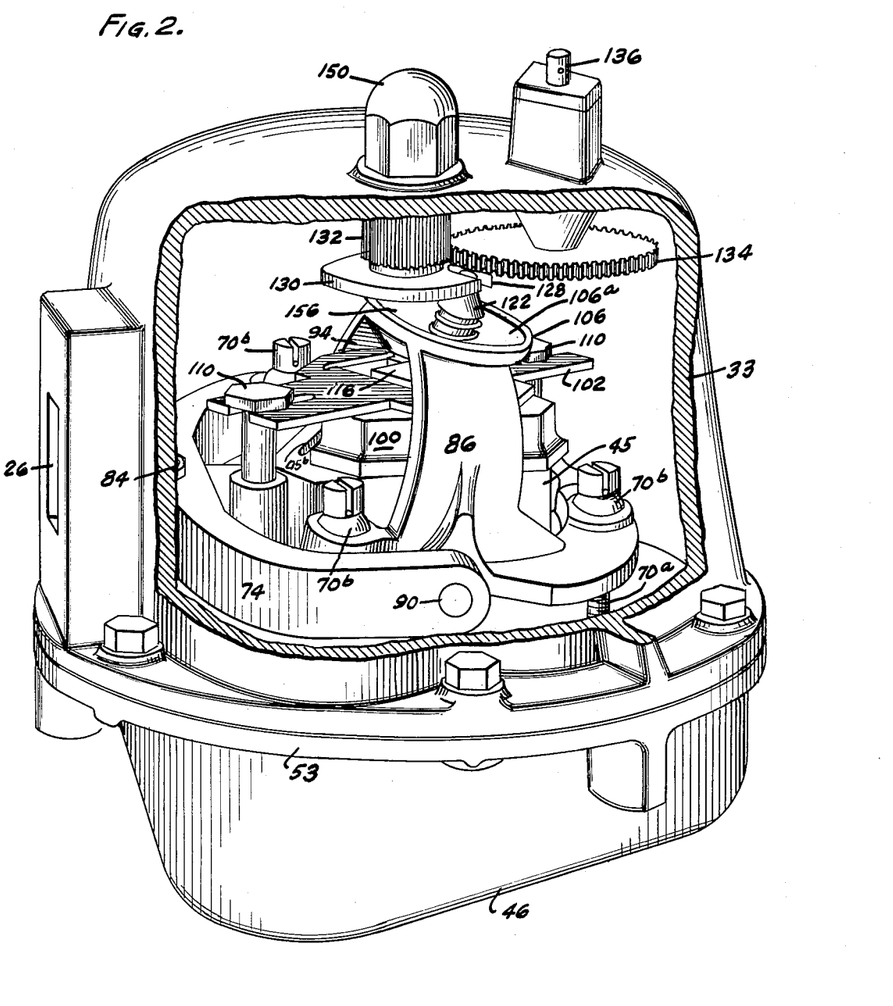
Fig. 2 is a front perspective view through the fluid meter with a front portion of the housing broken away so that the working parts may be more clearly seen.
Figures 3, 4:
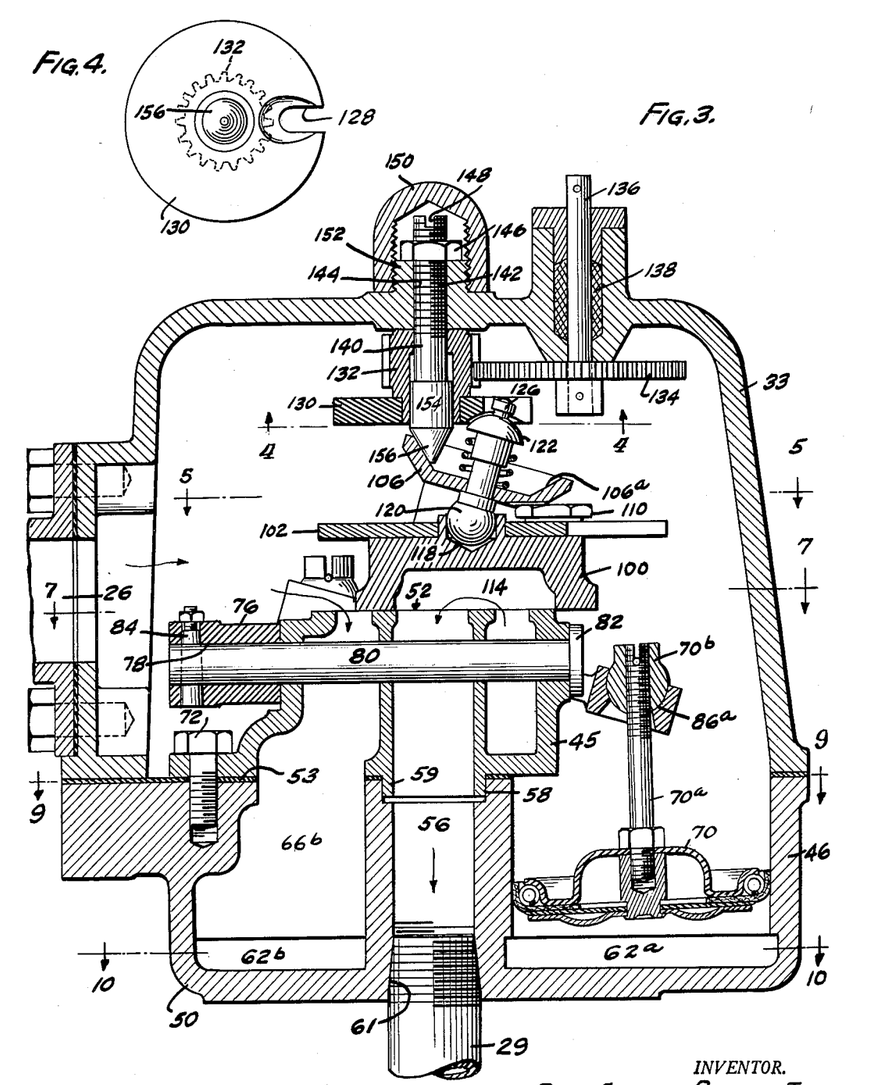
Fig. 3 is a generally central or vertical cross-sectional view through the fluid meter, the same being taken generally in the same plane of the perspective view Fig. 2.
Fig. 4 is a bottom plan view of the counter driving disc and is taken on the line 4—4 of Fig. 3.
Figure 5:
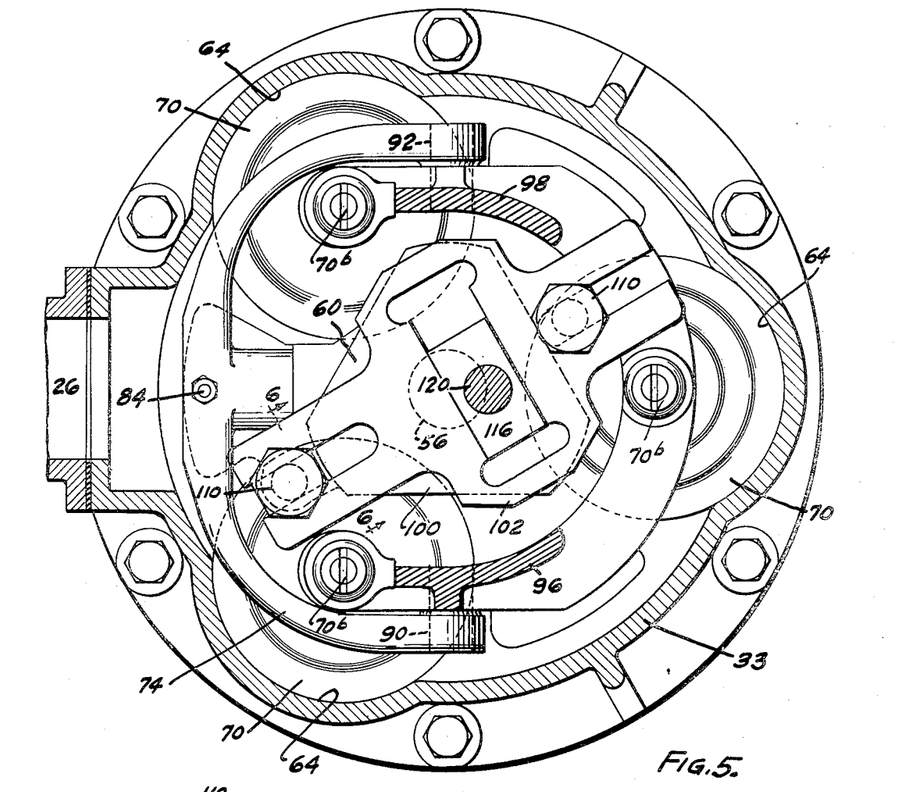
Fig. 5 is a plan sectional view through the fuel meter assembly and is taken generally on the line 5—5 of Fig. 3.
Figure 6:
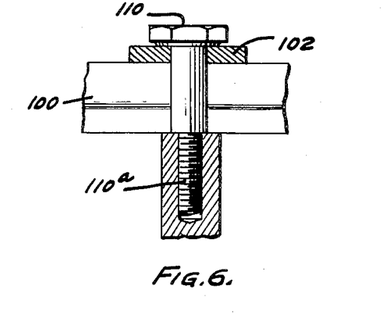
Fig. 6 is a detailed cross-sectional view of the slide guide and hold-down bolt and is taken generally on the line 6—6 of Fig. 5.

Referring to Fig. 1, it will be noted that the dispensing equipment to which the meter of the present invention may be applied includes a subterranean gasoline storage tank 10 having a filling spout 12 through which the tank may be replenished; an outlet conduit 14 may extend upwardly from a point inside the tank adjacent the bottom, the conduit being connected to the inlet side of an electrically driven gear pump 16 which draws gasoline from the tank and forces it through the dispensing equipment. A float valve 18 having a screened inlet is secured over the lower open end of the conduit 14 and a strainer 20 is secured adjacent the inlet chamber of pump 16 so that extraneous matter present in the gasoline in the storage tank may be excluded from the gear pump 16 and the other parts of the dispensing equipment.

From the outlet chamber of the pump 16, gasoline is forced through a conduit 22 and an air remover 24 to the inlet manifold 26 leading to the fuel meter housing 28. Gasoline is discharged from the meter housing 28 through a discharge pipe 29 at the lower end of the same, the pipe 29 being connected to a pipe line 30 which is in communication with a flexible hose 32 which has a nozzle 34 adapted to be introduced into the filling opening of a receptacle to be filled. The usual check valve 36 and visual flow indicator 38 are also provided, as is well known in the art.

The system herein disclosed is of the wet hose type so that it remains filled with gasoline at all times, and an immediate flow through the nozzle 34 may be obtained by opening the manually operated valve 40 associated therewith. The instant the valve 40 is opened, gasoline may flow from the nozzle 34 thus releasing the pressure in the system so that more gasoline is drawn by the pump 16 from the tank 10. From the outlet chamber of the pump the gasoline is forced through the conduit 22, air remover 24, and manifold 26, into the meter housing 28. The meter mechanism, as will presently be described, is connected by means of a shaft 31 to a visual register 44 which indicates to an observer the amount of gasoline which has been dispensed. This may also be provided with an indicator to show the cost of the amount of gasoline, as is well known in the art.

Figure 9:
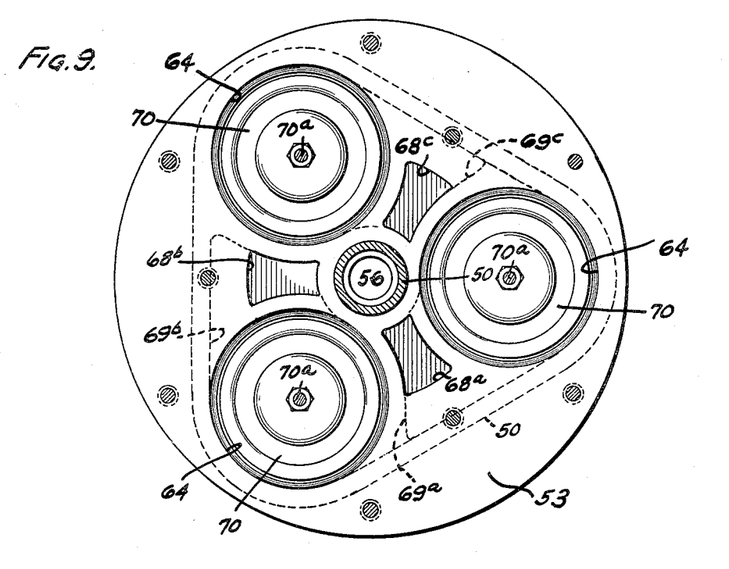
Fig. 9 is a plan sectional view taken on the line 9—9 of Fig. 3 showing the operating pistons of the meter, the valve seat ports and associated parts.
Figure 10:
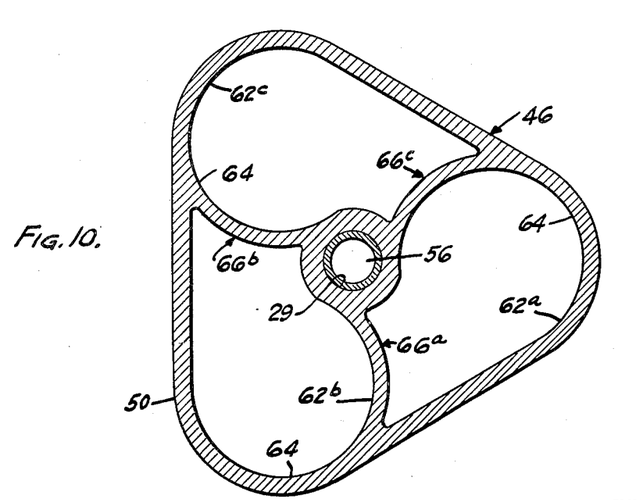
Fig. 10 is a plan sectional view at the lower end of the fuel meter housing below the cylinders showing the port connections with the cylinders.
Figure 11:
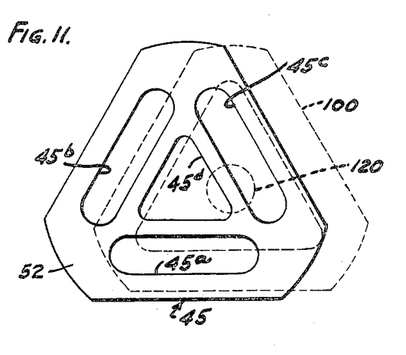
Figs. 11, 12, 13, 14, 15 and 16 are generally diagrammatic plan views of the ported cylinder block showing the valve seat and the distributing valve at 30 degree intervals in the radius it travels during 180 degrees of its travel during its cycle of operation.
Figure 12:
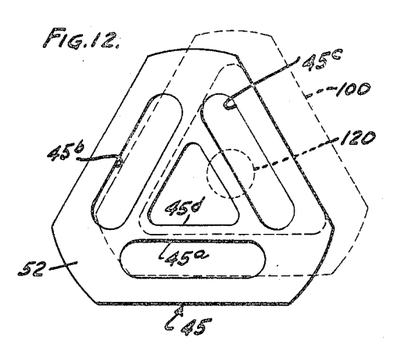
Figure 13:
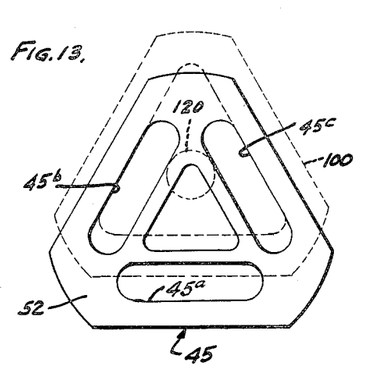
Figure 14:
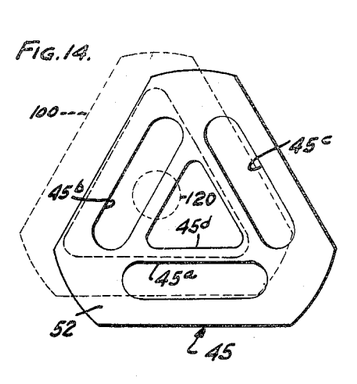
Figure 15:
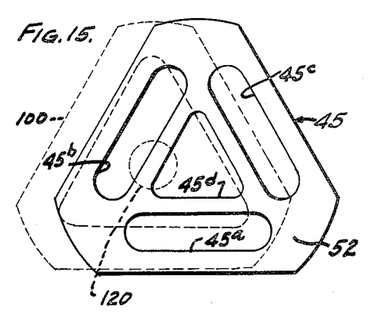
Figure 16:
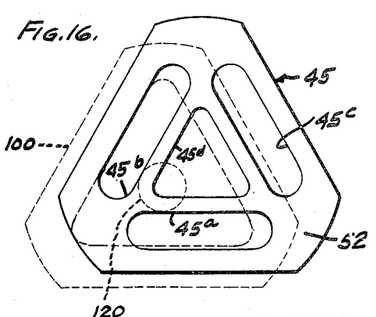

Referring now to Figs. 2 to 16 inclusive, wherein the detailed construction of the meter is illustrated, the meter housing may include a dome shaped housing member 33 and a base 46 which includes a valve plate member 45 which supports other operating parts of the meter. The base 46 has a main body portion or cylinder block 50 which is generally triangular in shape as best seen in Figs. 9 and 10. The base is also formed with a top circular plate portion 53 which makes a fluid-tight seal with the bottom edge of the housing member 33. A medial passageway 56 extends through the top 53 and the triangular body 50 of the base and has an enlarged upper bore 58 to receive a circular shoulder 59 on the bottom of the plate member 45. The passageway also has a tapped lower end 60 to receive the threaded end of the discharge conduit 29 which is in communication at its other end with the delivery pipe line 30 of the dispensing system shown in Fig. 1.

Integrally cast in the base 46 along a center line equidistant from its vertical axis and at intervals equally spaced from each other are three cylinder wells 62a, 62b and 62c which extend vertically downwardly through the top 53 and into the triangular portion 50 of the base. These wells form the cylinders in which the pistons 70 of the meter operating mechanism reciprocate; hence, the cylindrical walls 64 thereof are machined so that the pistons will snugly engage these walls and leaking from one side of the pistons to the other will be prevented.

While a base having three cylinders has been disclosed herein, it is to be understood that the number of cylinders can be increased if a meter operating mechanism having more than that number of pistons is to be used. In such a case, the main body 50 of the base will have to be made square or round in outline to provide the necessary space for the increased number of cylinder wells.

In addition to the vertical passageway 56 and cylinder wells 62a, 62b and 62c, the case 46 is also provided with three ducts, 66a, 66b and 66c, formed in the space between the wells. The upper ends of these ducts terminate in ports in the surface of the top 53. At their bottom ends, each of these ducts communicates with the bottom of that cylinder well which is located to the right of the duct, as shown at 69a, 69b and 69c, respectively, in Figs. 9 and 10, which also show the ports 68a, 68b and 68c in the top 53 of the base 50.

The meter operating mechanism may be mounted upon the member 45 which is fastened by suitable bolt members 72 to the top of the base 46, a suitable gasket being provided to make the connection leak-proof. The mechanism may further include a fork member 74 which is provided with a boss 76 and an internal bore 78 to receive a pivot shaft 80 that is provided with a head 82 and extends through a horizontal bore adjacent the top of the member 45.

The fork 74 may be fastened to the pivot shaft 80 by a tapered pin member 84. The fork 74 is adapted to carry the yoke member 86, the yoke member being pivotally connected thereto by means of pivot pins 90 and 92 at the ends of the arms of the fork. The yoke member may have an arch portion 94 which includes the arms 96 and 98 which are arched above the distributing valve 100 and valve slide guide 102 and form a generally cup-shaped receptacle 106 adjacent the top of the same. Each of the pistons 70 is provided with a rod 70a which terminates in a ball-shaped fastener 70b adapted to be seated in an arcuate opening 86a in the yoke 86, the opening through which the rod 70a extends being convex so that a universal joint effect is secured between the yoke and the piston rod.

The plate member may also receive a pair of valve slide guide pins 110, the same having a screw-threaded extension 110a received in tapped openings in a pair of bosses 112 upon opposite sides of the plate member 45.

The distributing valve or slidable valve 100 may be mounted upon the top of the valve plate 45 in sliding relation thereto and be generally triangular in shape. It is provided with a chamber 114 of generally triangular shape so that the same will form a passageway between two or more of the ports in the top of the plate member, as will be hereinafter described.

The valve 100 may also be formed with a rectangularly shaped block or shoulder 116 forming a cross head thereon. A medial socket 118 is provided in the cross head 116 to receive the spherical head 120 of a crank arm 122 that is carried in the cup-shaped portion 106 of the yoke. The crank arm is provided with a semi-spherical head 122 and a driving end 126 which is received in the slot 128 of a disc member 130. The disc member 130 may be keyed to a pinion 132 which drives a face gear 134 that is keyed to a shaft 136 which extends outwardly from the housing 33 through a suitable stuffing box 138. The shaft 136 is connected at its outer end to the shaft 31 which drives the visual register 44 that indicates the amount of gasoline that has been dispensed and the cost of the same.

Means for adjusting the stroke of the pistons in the cylinders 64 may include an adjusting pin 140 which has a threaded shank 142 that is screw-threadedly mounted in a tapped opening 144 in the upper wall of housing 33. A lock nut 146 is provided for locking the adjusting pin in position after it has been set by means of the screwdriver slot 148 in the upper end of the same, and a cap 150 is also provided for fastening down over the adjusting pin and boss 152 through which the adjusting pin is positioned.

The adjusting pin may have an enlarged lower end 154 terminating in a tapered point 156 which in operation bears against the tapered wall 106a of the cup-shaped portion 106 of the yoke.

Figure 7:
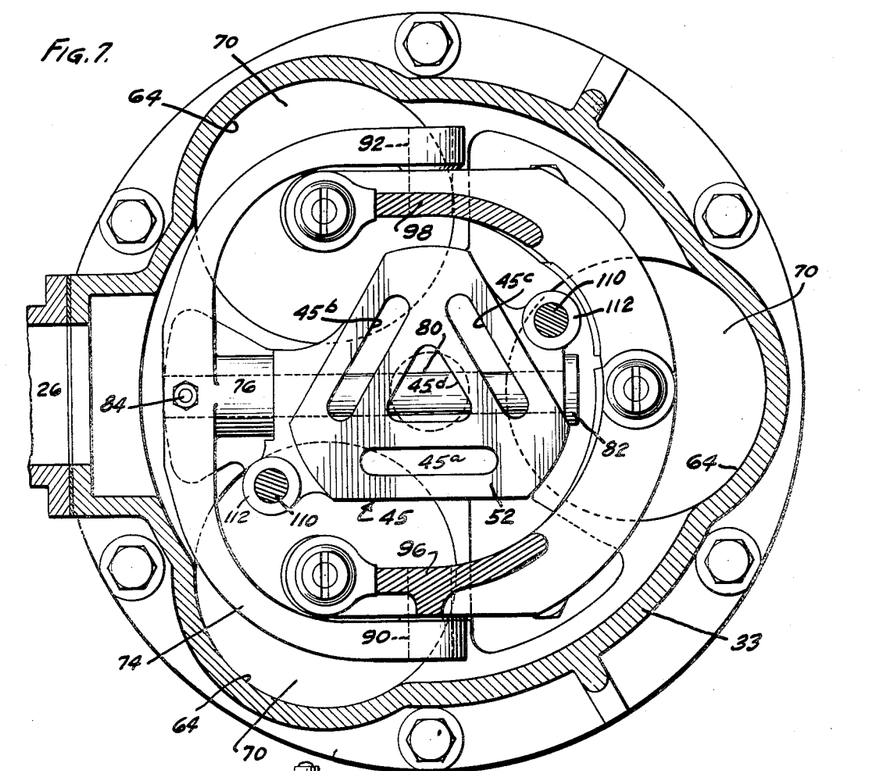
Fig. 7 is a plan sectional view at the top of the valve seat showing the ports and other parts of the fuel meter and is taken generally on the line 7—7 of Fig. 3.
Figure 8:
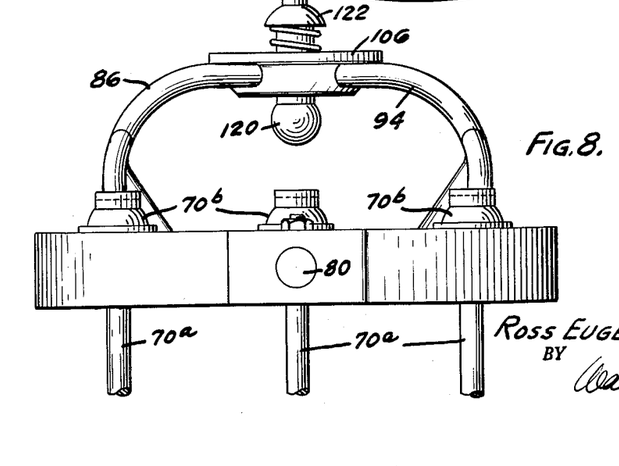
Fig. 8 is a fragmentary side elevational view of the yoke and fork assembled with the piston rods extending downwardly therefrom.

Referring now more particularly to Fig. 7, it can be seen that the upper end of the plate member 45 is formed with three elongated ports 45a, 45b and 45c, which, when the member is fastened upon the base, communicate with the ports 68a, 68b and 68c respectively. A central port 45d is at all times in communication with the passageway 56 which extends through the conduit 29 to the dispensing nozzle 34.

When fluid enters the housing 33 under pressure from the tank 10, as for example when the throttle 40 of the nozzle 34 is open to discharge gasoline from the system, the pressure of incoming gasoline will force one of the upper pistons 70 downwardly, forcing gasoline therebeneath to be discharged upwardly through one of the ducts 66 and ports 45 of the distributing valve through the outlet 45d and into the conduit 29. At the same time, fuel entering the chamber 33 is flowing into one of the cylinders 64 below one of the raised pistons through one of the ports 45 that is partially open during this operation. The movement of the pistons 70 in an up and down motion causes a rocking of the fork 74 and the yoke 86 which effects a universal joint action so that the yoke 86 may travel in a gyratory manner, carrying the cup-shaped top 106 of the yoke about in a similar gyratory action. This moves the distributing valve 100 in a circular path covering and uncovering the ports on the plate member 45, as most clearly shown in the diagrammatic views 11 to 16 inclusive. In this series of views, one-half of a cycle of operation of the valve has been shown, and in these views it can be seen that at least a portion of one port is open to receive incoming gasoline with the other two open to the discharge port 45d to permit discharge of gasoline through the outlet conduit 29 by reason of the downward pressure of the pistons 70 in the cylinders.

Due to the fact that the valve slide 102 is only capable of back and forth movement upon its pins 110 and carries a slot to receive the cross head 116 on the top of the valve 100, the valve is moved in a circular direction without being permitted to turn about its own axis. In this manner, the alignment of the ports on the cylinder head and the chamber in the valve are always in such relationship so that one of the cylinder head ports will be open to receive incoming gasoline, and the other two will be in direct communication with the discharge port 45d through the chamber 114 in the distributing valve.

Also, as the crank arm is thus actuated, the upper end of the same rotates the counter driving disc causing rotation of pinion 132 and gear 134 to drive shaft 31. This operates the visual register 44 to show the amount of gasoline dispensed and the price of the same. When it is desired to adjust the flow of fuel through the meter, the adjusting pin 140 may be turned to raise or lower the tapered point 156 thereof. In this manner the length of the stroke of all three pistons can be either increased or decreased, and the meter can thereby be calibrated.

While I have illustrated and described a specific embodiment of the invention, it will be apparent to those skilled in the art that changes and modifications may be made in the exact details shown, and I do not wish to be limited in any particular; rather what I desire to secure and protect by Letters Patent of the United States is:

1. A fuel meter comprising a cylinder block and valve plate member, said block having a plurality of cylinders opening on a surface thereof, ducts leading from the inner end of said cylinders to ports in said valve plate member, and a fuel outlet adjacent said ports; a valve member movable orbitally on the face of said valve plate member rotationally and successively to open said ports and to place said ports in communication with said outlet, sliding guide means interconnecting said valve and a fixed portion of said meter to prevent rotation of said valve, pistons mounted in said cylinders, a fork connected to said valve plate member for pivotal movement on an axis parallel to said valve face, a yoke pivotally connected to said fork on an axis transverse of the axis of fork pivoting, rods interconnecting said pistons and said yoke, a crank arm connected to said yoke, means rotationally operable to operate a fuel flow register, said crank arm being connected to said valve member and said register operating means to move said member orbitally and said means rotationally, a housing secured to said block to enclose said cylinders and all of the above mechanism, and means for admitting fuel under pressure into said housing, so that the relief of pressure in said outlet effects a draining of one of said cylinders to impart a nutating movement to said crank arm which in turn moves said valve to drain the next successive cylinder and permit a refilling of said first cylinder.

2. A fuel meter comprising a cylinder block and valve plate member, said block having a plurality of cylinders opening on a surface thereof, ducts leading from the inner end of said cylinders to ports in said valve plate member, and a fuel outlet extending through said block and said valve plate member; a valve member movable orbitally on the face of said valve plate member rotationally and successively to open said ports and to place said ports in communication with said outlet, sliding guide means interconnecting said valve and said valve plate member to prevent rotation of said valve, pistons mounted in said cylinders, a fork connected to said valve plate member for pivotal movement on an axis parallel to said valve face, a yoke pivotally connected to said fork on an axis transverse of the axis of fork pivoting, rods interconnecting said pistons and said yoke, a crank arm connected to said yoke, means rotationally operable to operate a fuel flow register, said crank arm being connected to said valve member and said register operating means to move said member orbitally and said means rotationally, a housing secured to said block to enclose said cylinders and all of the above mechanism, and means for admitting fuel under pressure into said housing, so that the relief of pressure in said outlet effects a draining of one of said cylinders to impart a nutating movement to said crank arm which in turn moves said valve to drain the next successive cylinder and permit a refilling of said first cylinder.

3. A fuel meter comprising a cylinder block and valve plate member, said block having a plurality of circularly arranged cylinders opening on a surface thereof, ducts leading from the inner end of said cylinders to ports in said valve plate member, and a fuel outlet extending through said block and said valve plate member; a valve member movable orbitally on the face of said valve plate member rotationally and successively to open said ports and to place said ports in communication with said outlet, sliding guide means interconnecting said valve and said valve plate member to prevent rotation of said valve, pistons mounted in said cylinders, a fork connected to said valve plate member for pivotal movement on an axis parallel to said valve face, a yoke affording a circle of evenly spaced attachment points pivotally connected to said fork on an axis transverse of the axis of fork pivoting, rods interconnecting said pistons and said attachment points of said yoke, a crank arm connected to said yoke, means rotationally operable to operate a fuel flow register, said crank arm being connected to said valve member and said register operating means to move said member orbitally and said means rotationally, a housing secured to said block to enclose said cylinders and all of the above mechanism, and means for admitting fuel under pressure into said housing, so that the relief of pressure in said outlet effects a draining of one of said cylinders to impart a nutating movement to said crank arm which in turn moves said valve to drain the next successive cylinder and permit a refilling of said first cylinder.

4. A fuel meter comprising a cylinder block and valve plate member, said block having a plurality of cylinders opening on a surface thereof, ducts leading from the inner end of said cylinders to ports in said valve plate member, and a fuel outlet adjacent said ports; a valve member movable orbitally on the face of said valve plate member rotationally and successively to open said ports and to place said ports in communication with said outlet, sliding guide means interconnecting said valve and a fixed portion of said meter to prevent rotation of said valve, pistons mounted in said cylinders, a fork connected to said valve plate member for pivotal movement on an axis parallel to said valve face, a yoke pivotally connected to said fork on an axis transverse of the axis of fork pivoting, rods interconnecting said pistons and said yoke, a crank arm connected to said yoke, means rotationally operable to operate a fuel flow register, said crank arm being connected to said valve member and said register operating means to move said member orbitally and said means rotationally, a housing secured to said block to enclose said cylinders and all of the above mechanism, means for admitting fuel under pressure into said housing, an adjusting pin mounted in said housing coaxial with the cone of nutation of said crank arm, a cup mounted on said yoke and surrounding said crank arm and having walls which contain and engage the inner end of said adjusting pin, one of said engaging surfaces as between said pin and said cup walls being inclined with respect to the axis of nutation, said pin being adjustable externally of said housing to move the inner end thereof variably into and out of said cup.

5. In a fuel meter of the type described characterized by a plurality of cylinders having pistons therein, a yoke connected to said pistons and mounted for nutational movement and a crank arm carried by said yoke and operating valve means to control a successive evacuation and filling of consecutive cylinders and also to drive a fuel meter register; means for adjusting the movement of said pistons in said cylinders to calibrate said register comprising a pin co-axial with the cone of nutation of said yoke and a cup on said yoke having walls containing and bearing against one end of said pin, one of said engaging surfaces as between said pin and said cup walls being inclined with respect to the axis of nutation, said pin being variably adjustable into and out of said cup.

6. In a fuel meter of the type described characterized by a plurality of cylinders having pistons therein, a yoke connected to said pistons and mounted for nutational movement and a crank arm carried by said yoke and operating valve means to control a successive evacuation and filling of consecutive cylinders and also to drive a fuel meter register; means for adjusting the movement of said pistons in said cylinders to calibrate said register comprising a pin having a conical end co-axial with the axis of nutation, the angle of said conical end being greater than the maximum angle of nutation, a cup mounted on said yoke having interior walls containing and bearing against the conical surface of said pin, said walls being approximately parallel to the conical surface of said pin at the point of contact between said walls and said pin, said pin being adjustable into and out of said cup.

References Cited in the file of this patent

UNITED STATES PATENTS 2,021,882     Bechtold              Nov. 26, 1935